United States Patent [19]
Nyman et al.

[11] Patent Number: 5,662,871
[45] Date of Patent: Sep. 2, 1997

[54] METHOD FOR EXTRACTING METALS FROM LARGE SOLUTION FLOWS AND APPARATUS FOR REALIZING THE SAME

[75] Inventors: Bror Nyman, Ulvila; Valto Mäkitalo, Pori; Launo Lilja, Pori; Sti-Erik Hultholm, Pori; Timo Saarenpää, Espoo, all of Finland

[73] Assignee: Outokumpu Engineering Contractors Oy, Finland

[21] Appl. No.: 349,052

[22] Filed: Dec. 2, 1994

[30] Foreign Application Priority Data

Dec. 2, 1993 [FI] Finland .................................. 935393

[51] Int. Cl.⁶ .................................................. B01D 11/04
[52] U.S. Cl. ........................... 422/259; 210/205; 210/511; 366/184; 366/279
[58] Field of Search ............................... 422/258, 259; 210/205, 511; 366/184, 279

[56] References Cited

U.S. PATENT DOCUMENTS

| | | | |
|---|---|---|---|
| 2,048,820 | 7/1936 | Schmid | 422/258 |
| 2,646,346 | 7/1953 | Coplan et al. | 210/511 |
| 2,701,753 | 2/1955 | Eisenlohr et al. | 422/258 |
| 2,710,250 | 6/1955 | Andrews et al. | 422/258 |
| 3,544,079 | 12/1970 | Dressler | 422/258 |
| 4,235,602 | 11/1980 | Meyer et al. | 422/259 |
| 4,404,173 | 9/1983 | Bailey et al. | 422/258 |
| 4,859,326 | 8/1989 | Evers | 422/259 |
| 5,185,081 | 2/1993 | Nyman et al. | 422/259 |

Primary Examiner—Timothy McMahon
Attorney, Agent, or Firm—Brooks Haidt Haffner & Delahunty

[57] ABSTRACT

The invention relates to a method for extracting metals from large solution flows in liquid—liquid solvent extraction and to an apparatus for realizing the same. By employing the method and apparatus of the invention, it is possible to choose which phase is maintained continuous at the dispersion stage, while the other phase remains as drops, to prevent the aeration of the organic phase and to pump the phases further at a low circumferential speed in order to prevent emulsification. Another object of the invention is to make the dispersion removed from the settler unit spread in the settler unit over the whole transversal area thereof. The method and apparatus of the invention are particularly well suited to large copper extraction plants.

7 Claims, 5 Drawing Sheets

METHOD FOR EXTRACTING METALS FROM LARGE SOLUTION FLOWS AND APPARATUS FOR REALIZING THE SAME

The present invention relates to a method for extracting metals from large solution flows in liquid—liquid solvent extraction and to an apparatus for realizing the same. By employing the method and apparatus of the invention, it is possible to choose which phase is maintained continuous in the dispersion, while the other phase is present as drops, the aeration of the organic phase is prevented and the phases are pumped further at a low circumferential speed in order to prevent emulsification. Another object of the invention is to achieve an even distribution of the dispersion discharged from the mixer part into the settler part, over the whole transversal area thereof. The method and apparatus of the invention are particularly suited in large copper extraction plants.

In liquid—liquid solvent extraction processes treating large solution flows it is particularly difficult to transfer the solutions between the different stages of the process in a controlled fashion. This is especially true with solutions containing some lighter organic extraction agent, such as kerosene solution, which is difficult to make penetrate into a mixer space containing some heavier dispersion. This difficulty is increased along with the growth of the employed equipment - according to current technology, the solutions enter the mixer area at the bottom of the equipment, and are removed from the top. As the size of the equipment grows, the hydrostatic pressure grows as well, and an even more intensive external power is needed in order to form the desired solution flow.

The specific weight of a kerosene solution is roughly 0.80 g/cm$^3$, while the specific weight of an aqueous solution is, depending on the process and the stage at hand, 1.02–1.20 g/cm$^3$. When these solutions are mixed into a dispersion, where one solution is present as drops in the other solution, and the mixing ratio between the said solutions in this mixing step is 1.0, there is obtained a dispersion with a specific weight within the range 0.93–1.02 g/cm$^3$. In this case, the hydrostatic counterpressure in the mixer unit grows, as for the kerosene solution serving as the extraction solution, with an amount of 100–190 mm H$_2$O per each meter by which the feeding point is shifted downwards from the surface of the mixer unit. For process-technical reasons, it is advantageous to maintain the mixing ratio near the reading 1.0. If the mixing ratio is lower, the hydrostatic pressure caused by the mixing step is increased, and if it is higher than 1.0, the hydrostatic pressure is reduced.

In extraction plants treating large volumes of feed solutions, such as 500–1500 m$^3$/h per each mixer- settler line, there is currently applied the so-called Low Profile technique; it is typical of this technique that the mixer space is divided into three parts in order to avoid deep structures. Even in this case, however, it is necessary to have mixer spaces up to 3 m high when treating solution for instance 1,000 m$^3$/h, which is a typical volume for example in copper extraction. According to this technique, the first mixer unit is built as a pump mixer, whereto both solutions are conducted from below, and wherefrom the solutions are removed and fed to the next mixer at the top. The second and third mixers do not have a pumping task, but they serve as pure mixer reactors only.

The solutions of the pump mixer are fed in through the bottom inlet due to the suction effect of a radial turbine rotating immediately above the bottom inlet. Underneath the bottom of the pump mixer, there is provided a collecting space whereto the aqueous solution and the extraction solution are both conducted first; this means that the extraction solution must also be sucked in at a spot which causes a hydrostatic counterpressure of 300–570 mm H$_2$O. This leads to a disadvantageous situation where the radial turbine in question must be rotated at a higher rpm than is necessary for the mixing itself. Thus the circumferential speed of the turbine must be raised up to the range 5.0–6.0 m/s, in order to make sure that the extraction solution enters the mixer. At a circumferential speed of 5.5 m/s, it is possible to produce a pressure difference corresponding to about 700 mm H$_2$O over the said turbine.

In the pump mixer, it is attempted to prevent an overmixing, particularly of those layers that are located near the turbine, by extending the turbine diameter in relation to the mixer itself. Although this ratio is raised up to the highest possible reading from the technical point of view (in practice about 0.65), there always remains an area - the same area where the turbine itself rotates - which is mixed too vigorously. There the mixing is within the range 5–15 kW/m$^3$. Inevitably this kind of mixing leads to the formation of small drops, with a diameter less than 0.1 mm. This means that part of the drops are so small that they do not have enough time to be separated by gravitation in the settler unit. The situation is made even more complicated by the fact that the unattenuated agitation of the turbine is effective throughout the whole space of the mixer. The mixing conditions in the two successive serial mixers are not essentially different from those of the first. According to current technology, also local mixers are used in these, and they are of the blade mixer type. Because these mixers do not have to do any pumping, the force of the agitation can be kept somewhat lower than in the first mixer, i.e. the agitation is within the range 2–7 kW/m$^3$, but even at this rate there are formed drops that are too small for separation.

According to the technology that is currently used, in large extraction units the dispersion flows directly and horizontally out of the last mixer. The discharge outlet is generally as deep as the separation unit of the solutions, i.e. the settler. Thus the depth of the solution flow is roughly 0.6–1.0 m, and its width is the same or somewhat narrower than the width of the last mixer space, i.e. roughly 3.5 m. By using a large flow aperture, the velocity of the horizontally proceeding flow is attempted to be kept on the level of about 0.2 m/s. This flow collides the primary divider in the front section, which comprises a picket fence built vertically over the whole width of the separation area and is provided with vertical slots of for instance 10–25 cm. For separation-technical reasons, current tendency is towards wide separation structures, with a width of roughly 20–30 m. The cross-section of a settler is often quadrate, in which case the inlet of the dispersion is a mere hole in the top part of one side. As a result, the dispersion coming from the mixer flows directly into the settler unit and brings along the turbulent motion caused by the mixer, which motion disturbs an even distribution of the dispersion over the whole width of the separation.

As was pointed out above, different picket fence constructions increasing flow resistance can be used in the primary distribution of the dispersion flowing out of the discharge outlet of the last mixer over the width of the settler space. As the size of the settlers increases, the use of the said picket fences also becomes more cumbersome. One difficulty is to distribute the flow evenly over the whole width of the transversal area so that the flow in the middle is not particularly stronger than at the sides. It has been attempted to avoid this phenomenon - which disturbs drop separation

- by closing those apertures that are located directly at the dispersion inlet. The harmful phenomenon has not, however, completely disappeared. Behind the closed slot, the liquid surface forms a recess, which again causes circulations towards it. These circulations collide and turn to flow in the direction of the center line of the settler space, so that at the center line there is again formed a flow that is stronger than at the sides, although its area is somewhat more limited than in the above described case.

When processing large solution flows, the controlling of the type of the dispersion also is more difficult than with smaller volumes. By the type of the dispersion we mean: which liquid is present as drops in the continuous solution of the other liquid. However, it is important control the type of dispersion, because it is a way to define how much crud is created in the extraction owing to the effect of solids present in the feed solution. Generally crud formation is smaller when the aqueous solution is chosen to be present as drops in the extraction solution, i.e. when the organic solution is the continuous phase. Thus the proportion of the organic phase in the aqueous solutions going to the next sub-stages of the process is reduced. The organic phase is made continuous for instance by pumping only extraction solution at the beginning; then the mixing is started, and the proportion of the extraction solution grows particularly in the last mixer, whereto the extraction solution is pumped, and thus it is easier to make the organic phase continuous. In conventional technology, this has proved to be the only way, but even this is difficult - particularly when the viscosity of the extraction solution is low. As for the viscosity, it is low when the content of the extraction agent in the kerosene solution is low. The employed extraction agent for instance in copper extraction is a selectively copper-extracting agent.

The entering of air into the mixer in connection with the feeding of the solutions is a disturbing factor and causes extra motion in the settler unit; it may also change the extraction solution owing to the slowly proceeding oxidation. At worst, air may endanger the function of the whole extraction process. Normally, however, air is mixed into the dispersion in the mixers, which are generally open at the top. Turbines and blade mixers create such a vigorous motion on the surface, that a certain amount of air inevitably enters the process. The overflows of the extraction and aqueous solutions at the rear end of the settler unit are other places where air is sucked into the solutions.

The object of the present invention is to eliminate some of the above described drawbacks, particularly those that are connected to the treatment of large volumes of solutions. Thus the invention relates to a method and apparatus for controlling the type of dispersion present in the mixer unit in liquid—liquid solvent extraction, for a controlled transfer of the solutions between the various stages or steps of the extraction process by applying low pumping pressure and for conducting the dispersion evenly over the whole transversal surface of the settler. Another object of the invention is to prevent air from entering the process. The essential novel features of the invention are apparent from the appended patent claims.

According to the invention, the mixing stage in liquid—liquid solvent extraction advantageously consists of at least three separate steps, the first whereof serves as a dispersion-pumping device, a so-called overflow pump, and the rest are mixer steps proper, i.e. mixers. The pumping of the solutions takes place at a low circumferential speed, which is below 5 m/s, generally within the range 3.5–4.5 m/s, by means of a pump turbine which is encased both at the sides and at the top. The rotational motion is slowed down to a level which is sufficient to keep the solutions contained in the overflow pump in dispersion. The solutions to be fed into the pump device are immediately conducted to below the turbine in order to reduce the counterpressure and to cut the circumferential speed of the turbine down to a required level.

Owing to its encased structure, the installation level of the turbine of the overflow pump is near the surface, at a distance of 0.5–1.0 times the turbine diameter from the surface. Therefore the dispersion overflow pump (DOP) can be built low, so that the depth of the solution may be even half of the diameter of the overflow pump. This again reduces the hydrostatic counterpressure of the organic phase and makes it possible to run the turbine of the overflow pump at a low circumferential speed as was explained above. The overflow pump is located at a height where the dispersion discharged from the turbine flows horizontally from the overflow pump, from the aperture opening against the bottom to the top part of the next mixer.

From the pumping step of the dispersion, the dispersion is further conducted to the first mixing step, to the top part of the first mixer. This fashion of feeding the flow lowers flow resistance particularly in cases where the intake of the dispersion happens in the mixing direction of the mixer. Both and/or all mixers are provided for instance by spiral mixers described in the U.S. Pat. No. 5,185,081. The top parts of the mixers are closed by means of a horizontal plate, which is located somewhat lower than the over-flow treshold of the organic solution in the settler. This arrangement prevents air from getting mixed into the mixers, especially because a slight hydrostatic overpressure prevails in the mixers. From the middle or bottom part of the first mixer, the dispersion is further conducted to another mixer, to its middle or bottom part, through a horizontal channel or pipe.

From the last mixing step, i.e. from the second mixer, the dispersion is conducted to the settler section through a separate uptake shaft. From this mixer, the dispersion is conducted, near the bottom part thereof, to an uptake shaft which is located tangentially with respect to the mixing direction of the mixer. The uptake shaft is of the same height as the mixer, and its width is roughly half of the diameter of the mixer. The dispersion rises in a controlled fashion up to the liquid surface of the settler and circulates from the uptake shaft as an upwards directed flow to the settler unit - not as a settler-deep horizontal inlet flow as in conventional technology.

In order to distribute the dispersion evenly over the whole width of the settler, the above mentioned uptake shaft is made use of; owing to this shaft, the liquid surface at the first end of the settler rises, especially as the dispersion flows towards the regulating gate arranged in the form of a half-cylinder. In the picket fence, which constitutes a regulating gate oriented towards the dispersion flow, and of sides directed towards the front angles of the settler unit, there are formed vertical slots, directed forwardly in the flowing direction. Within the area of the regulating gate, the vertical slots are advantageously narrower than the slots located at the sides; thus their width is 1/5–1/3 of the width of the slots located at the sides. The number of slots per meter is advantageously 3–7. The purpose of the upwardly directed intake flow is to slow down the entering speed of the dispersion into the settler by means of gravitation, at the same time as the dynamic rising of the surface helps an even distribution in the sideways direction and reduces the pressure towards the regulating gate.

By means of the arrangement of the invention, the organic phase is normally made continuous, but in order to make it possible that also the aqueous phase should be made a continuous phase in the dispersion, there can be used so called start pipes with valves in between the mixers and the top part of the uptake shaft. An essential precondition for this is an intermediate pipe installed in between the mixers, in the middle or bottom part of the mixers, and an uptake shaft located after the last mixer. When the valves of the start pipe are opened in case of an interruption in the supply, the aqueous phase flows into the bottom part of the mixers owing to gravity, and when the process is restarted, the aqueous phase is fed from the settler of the same extraction step to the overflow pump; thus the aqueous phase can also be made continuous.

Yet another essential feature of the invention is a discharge shaft for the organic phase, located at the rear end of the settler; from the bottom part of this discharge shaft, there are drawn return flow channels to the next processing step, as well as to the overflow pump of the same unit. Both pipe systems are conducted as essentially horizontal. Corresponding pipes are provided for the aqueous solution.

BRIEF DESCRIPTION OF THE DRAWINGS

The invention is further described with reference to the appended drawings, where.

DETAILED DESCRIPTION OF PREFERRED EMBODIMENTS

Figure 1:
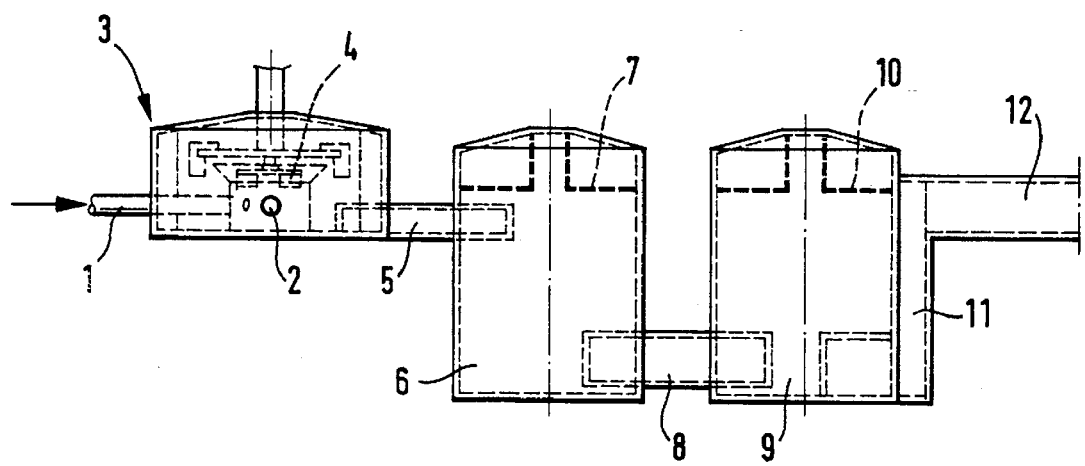
FIG. 1 illustrates the mixer step comprising the overflow pump and the mixers, seen at the side.
Figure 2:
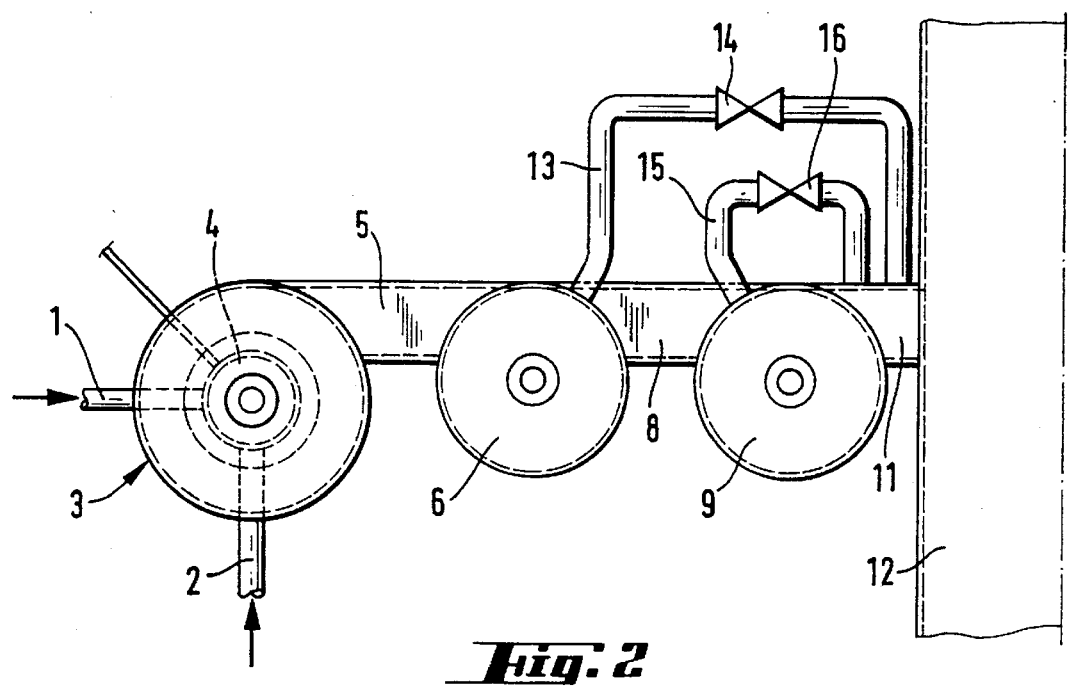
FIG. 2 illustrates the mixer step seen at the top.

As is seen in FIGS. 1 and 2, both the aqueous solution 1 and the organic phase 2 are conducted into the overflow pump 3 immediately underneath the turbine 4, where they are mixed by means of the turbine 4 and flow through the tangentially installed connecting conduit 5 to the first mixer 6. The conduit 5 is located at a height where it conducts the mixed solutions to the top part of the mixing space of this mixer. The mixer 6 is advantageously provided with a spiral agitator (not illustrated in the drawing) and covered with a horizontal plate 7 preventing air from entering the process. From the first mixer 6, the dispersion flows from the middle or bottom part of the mixer along the channel 8 to the middle or bottom part of the next mixer 9. The channel 8 is a covered pipe. The mixer 9 is provided with a horizontal plate 10 in order to prevent air from mixing into the process, as well as the first mixer, and also this mixer is provided with a spiral agitator (not illustrated in the drawing). The horizontal plates of the mixers are somewhat lower, for instance 50–200 mm lower than the overflow edge of the extraction solution in the settler.

The mixers are fairly high; their diameter or width is more or less of the same magnitude as their width. From the second mixer 9, which in this case also is the last mixer, the dispersion is discharged at the bottom part of the mixer to the uptake shaft 11 which is located tangentially with respect to the rotational direction of the dispersion. In the uptake shaft 11, the dispersion is raised up to a height in between the settler bottom and surface, to flow into the settler 12.

If an interruption or a run-down takes place in the process, the aqueous phase contained in the overflow pump and the uptake shaft sinks down to the bottom part of the mixers. Respectively, the light organic phase of the mixers flows either into the overflow pump and remains more or less in the mixers, depending on how the valves 14 and 16 of the start pipes 13 and 15 located in between each mixer and the uptake shaft are kept open. Water flows out of the overflow pump through the conduit 5, and through the same conduit there enters the organic phase, which means that the overflow pump is filled with the organic phase; thus the starting of the mixing after a supply interruption in this phase keeps the organic phase continuous. When, after restarting the feeding, the organic phase is still conducted into the overflow pump for some time, it is made sure that the organic phase is maintained continuous.

If, however, it is desired to have the aqueous phase as the continuous phase, this can be secured by means of a start pipe arrangement. For this purpose, in between the first mixer 6 and the uptake shaft 11, in the top part of the mixer, there is installed a start pipe 13 with a valve 14, and a similar start pipe 15 with a valve 16 is installed in between the second mixer 9 and the uptake shaft. During an interruption in supply or a run-down, the valves are opened, so that a heavier aqueous phase flows into the mixers from the settler via the uptake shaft, which aqueous phase pushes the lighter organic phase via the start pipes through the top part of the mixers to the top part of the uptake shaft. This is possible with the first mixer too, owing to the connecting mixer conduit located at the bottom. When the feeding is restarted, into the overflow pump there can still be conducted some aqueous phase from the settler of the same extraction step in order to make sure that the aqueous phase is maintained continuous.

Figure 3:
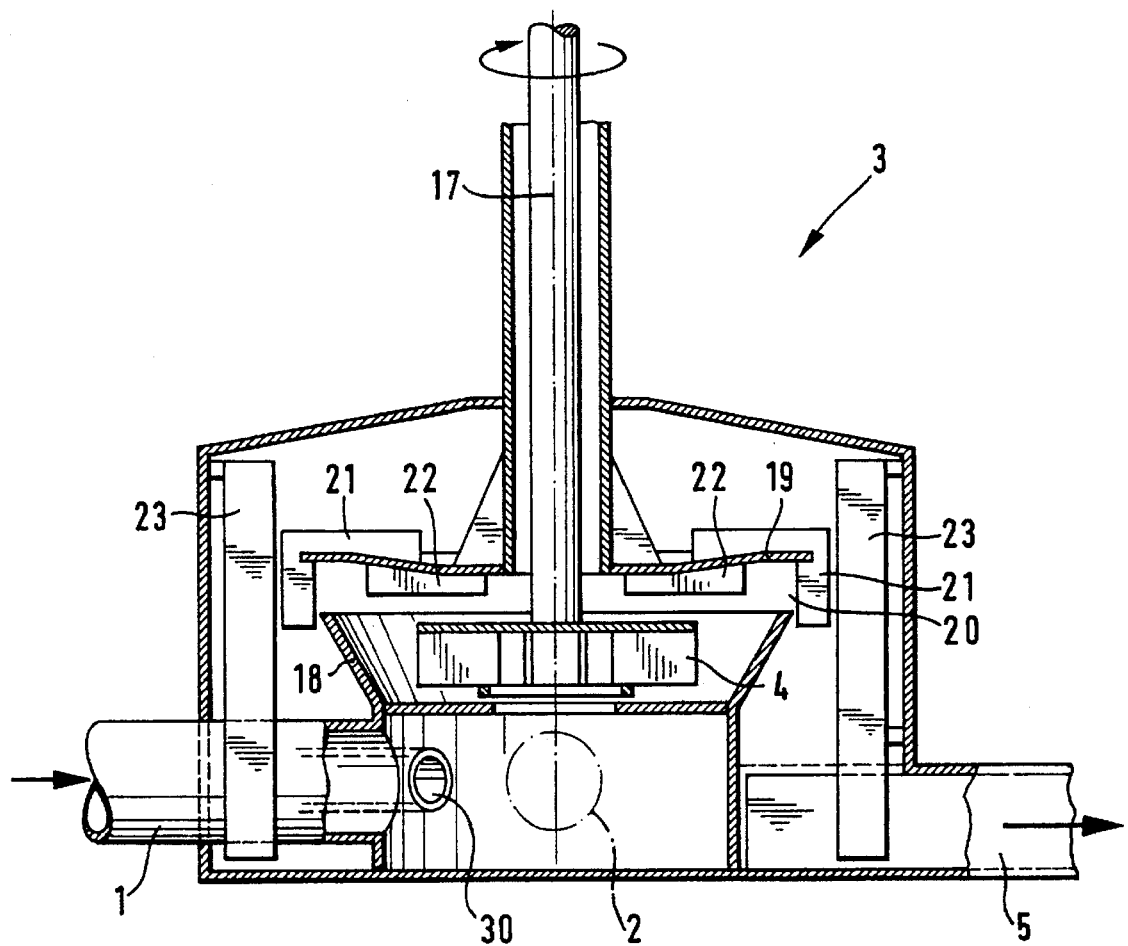
FIG. 3 illustrates a vertical cross-section of the overflow pump.

As is seen more specifically in FIG. 3, inside the overflow pump 3 there is located the pump turbine 4 rotating around its axis 17. At its sides, the turbine is encased by means of an upwardly opening conical side shell 18, and on the top by means of an air-stop plate 19, so that in between the shells, there remains an annular opening 20. This opening is located at a height where it is above the overflow edge of the organic phase collecting trough of the settler 12. When the bottom part of the opening is located at a suitable height (for instance <100 mm), higher than the overflow edge of the organic phase collecting trough of the settler, the extraction units are hydrodynamically independent. The phases mixed with each other are discharged through the annular opening 20 outwardly to every direction from inside the overflow pump 3, and this suffices to keep the contents of the overflow pump in dispersion.

The air-stop plate 19 is located outwardly from the axis 17, in an essentially horizontal position, and it can be partly upwards bent at its outer edges. On the outer edges of the plate, there are located angle flow baffles 21, which conform to the form of the air shell on the horizontal plane, and are directed downwardly outside the shells. It is advantageous to place internal flow baffles 22 underneath the air-stop plate. On the outer circumference of the overflow pump, there are provided conventional flow baffles 23. Advantageously the number of internal flow baffles is smaller than the number of angle flow baffles, their numbers being preferably for instance 4 and 8 respectively. This structure prevents air from entering the turbine shell, and conducts the discharging dispersion flow to proceed in a roughly horizontal direction.

The flow baffles installed inside the shell structure, together with the rest of the shell structure, even out the pressure prevailing inside the shell to be the same as inside the pump cylinder itself. This prevents air suction for hydrodynamic reasons. The surface area of the flow baffles is advantageously measured so that the rotational motion is transmitted to the overflow pump, and thus the shearing speeds inside the shell remain lower. By means of the flow baffles, the rotational motion is slowed down to a level where the mixed phases still remain in dispersion. The delay time of the dispersion in the turbine rotation space is only 3–20 s, advantageously only 5 s, and this time is not sufficient for reaching the balanced drop size, i.e. the drop size remains larger. Owing to the shell structure, the turbine installation level lies near the liquid surface, being underneath it for 0.5–1.0 times the turbine diameter. Now the overflow pump can be built low, so that the solution depth can be even less than half of the overflow pump diameter. This reduces remarkably the hydrostatic pressure of the infed organic phase, and inables the running of the turbine at a low circumferential speed, as was pointed out above. The pumping pressure applied in the overflow pump remains under the total pressure of 700 mm $H_2O$, generally on a level of 300–500 mm $H_2O$.

Figure 4:
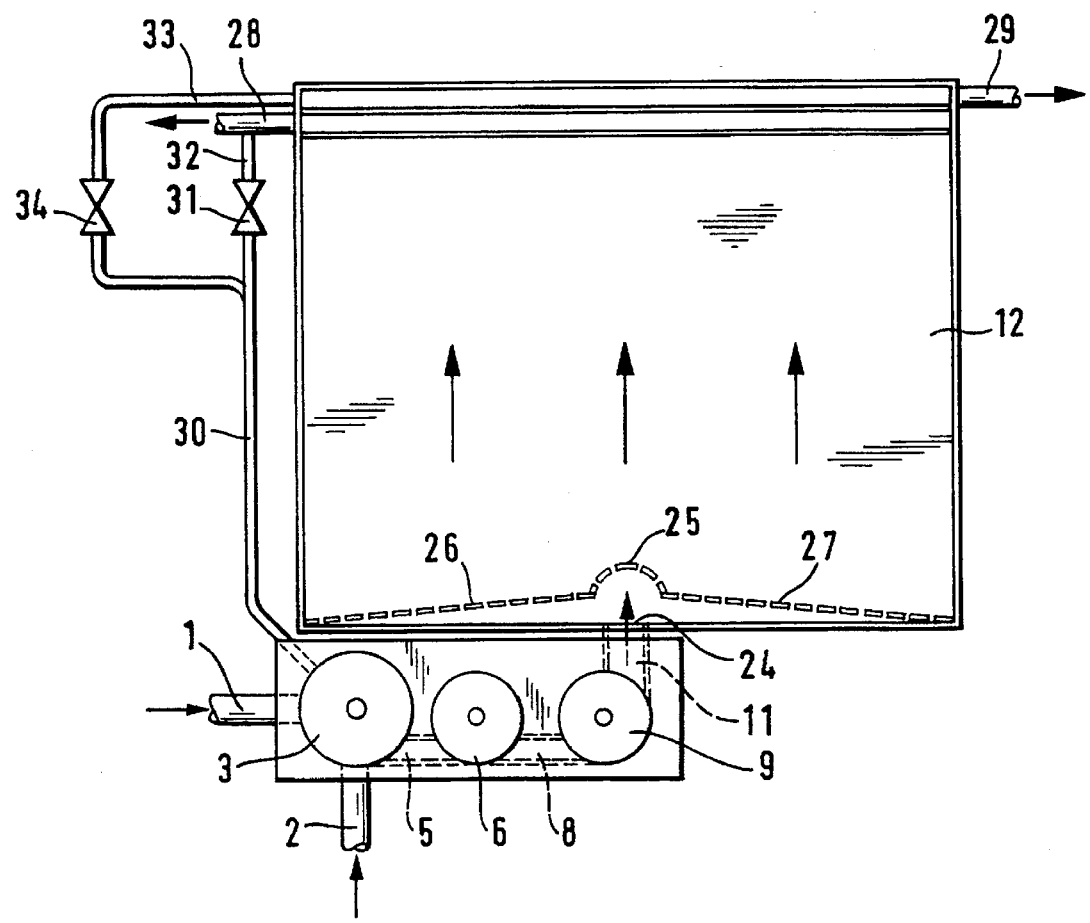
FIG. 4 illustrates the mixer-settler unit seen at the top.

As is seen in FIG. 4, the dispersion flows through the uptake shaft 11 located after the last mixer and via the inlet 24 thereof to the first end of the settler 12. In order to make the dispersion discharged from the uptake shaft to be distributed as evenly as possible over the whole transversal area of the settler, in the middle of the settler, at the first end thereof, there is located an essentially vertical picket fence, which comprises a regulating gate 25 in the form of a half-cylinder, this fence opening towards the inlet 24 of the dispersion, and gate sides 26 and 27, which extend over the transversal area of the settler and are directed towards the front angles of the settler. The regulating gate 25 is provided with slots in the lengthwise direction of the settler, the width of these slots being smaller than that of the apertures provided in the sides 26 and 27, so that in the area of the half-cylinder, the width of the slots is about $\frac{1}{5}$–$\frac{1}{3}$ of the width of the apertures located in the sides. The width of the side apertures is within the range 15–25 mm, and their number is 3–7 per meter.

Because the sides of the regulating gate are directed towards the front angles, this causes the dispersion flow to be fed into the settler to spread out towards the settler edges, so that after the picket fence, the flow proceeds in the settler in the lengthwise direction and along the whole width thereof.

Settled phases are removed at the rear end of the settler as essentially horizontal pipelines 28 and 29, depending on the extraction step, either to the next mixer-settler step or to further processing. From the rear end of the settler, solutions are also conducted to the overflow pump of the same step along the pipeline 30, in order to maintain the desired dispersion type when restarting the run. When the valve 31, in the conduit line 32 is opened, and the valve 34 in the circulation line 33 is closed, the organic phase is recirculated via the pipeline 30 to the overflow pump 3. Respectively, if we close the valve 31 and open the valve 34 in the pipeline 33, which opens up the line to the aqueous phase, the aqueous phase can be fed into the circulation of the same step. The recirculation of the organic phase ensures this phase to be the continuous dispersion type in the overflow pump and the mixers, and respectively the aqueous recirculation ensures the aqueous phase to be the continuous phase. By means of internal recirculation, the solution contact in the pump and the mixers themselves can also be improved.

Figure 5:
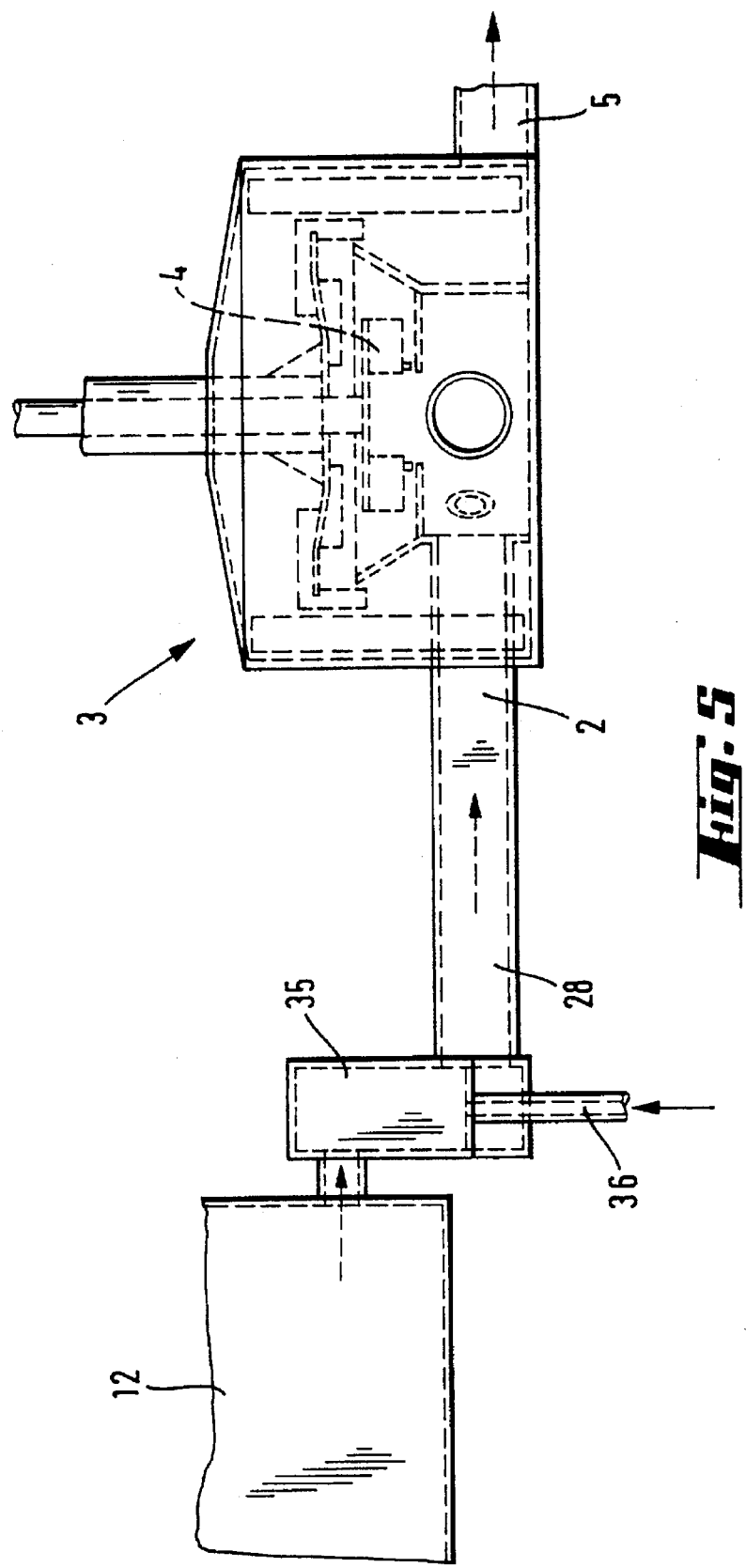
FIG. 5 is a side-view illustration of the discharge shaft located at the rear end of the settler.

FIG. 5 is a more detailed illustration of the discharge shaft 35 of the organic solution provided at the rear end of the settler 12. By means of this discharge shaft, the organic solution is discharged in a controlled fashion to flow in the feed channel 28 on the same level as the inlet pipe 2 of the overflow pump of the same or the next extraction step, in which case the organic phase flows horizontally into the overflow pump 3. The aqueous phase is also conducted, via its feed channel 36, and turned to flow horizontally to the next processing stage.

As is apparent from the specification above, all such places where the organic phase can be aerated owing to agitation or stronger circulation are covered in order to prevent this phenomenon. In similar fashion, the discharge shaft 35 is completely covered.

Figure 6:
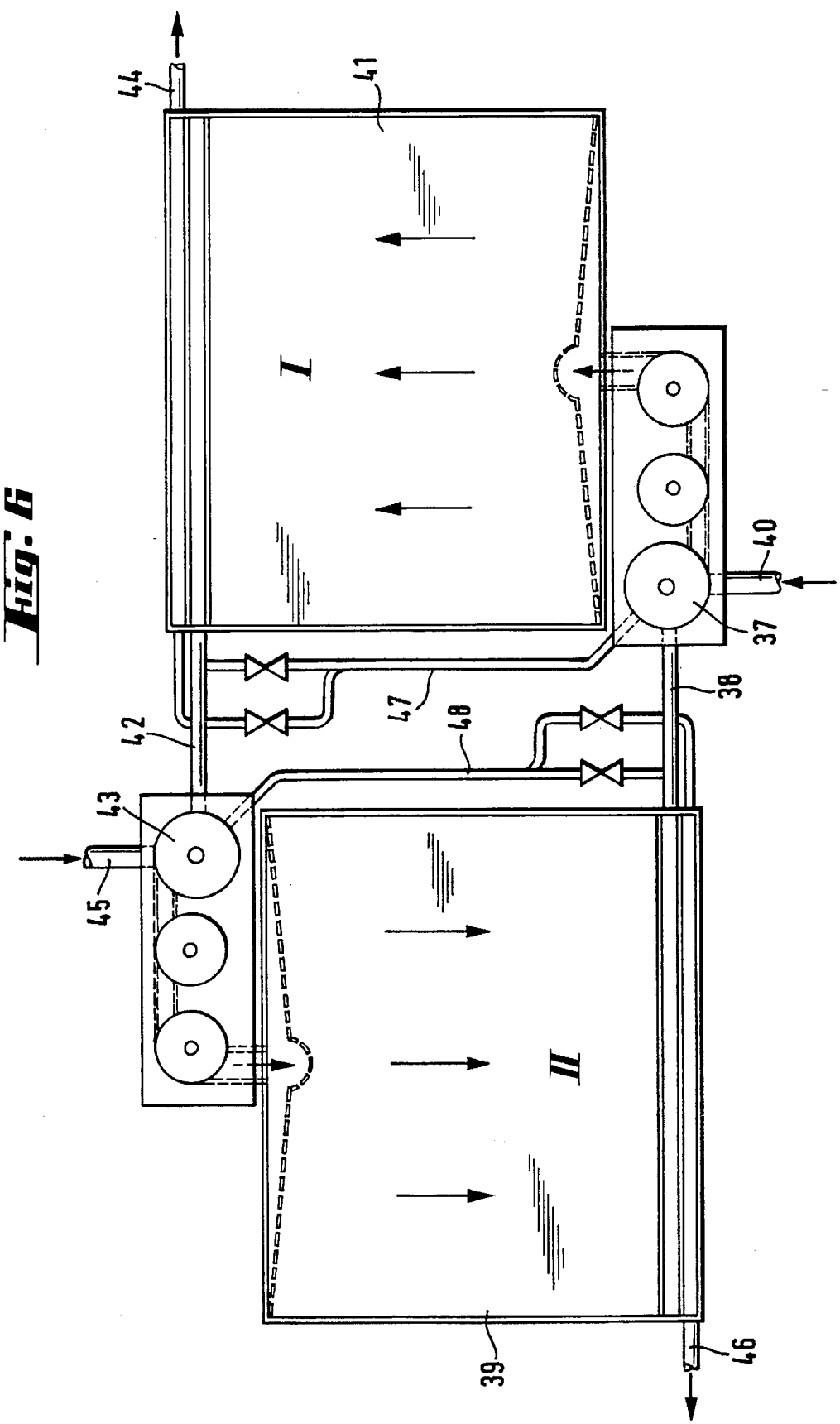
FIG. 6 illustrates two interconnected extraction steps seen at the top.

FIG. 6 shows how two extraction steps are matched together. The organic phase 38 is brought to the overflow pump 37 of the first extraction step I from the rear end of the settler 39 of the second step II, and the aqueous solution 40 is brought from ore extraction. From the rear end of the settler 41 of the first stage, the aqueous solution 42 is conducted to the overflow pump 43 of the second extraction step, and the organic phase 44 goes to washing or directly to re-extraction. To the overflow pump 43 of the second step, the organic phase 45 is conducted for instance from a storage container. The aqueous solution 46 of the second step is reconducted to ore extraction. The drawing also illustrates the internal circulations 47 and 48 of this step, which can be circulations of the organic or the aqueous phase, depending on which phase is chosen to be continuous.

We claim:

1. An apparatus for extracting metals in multi-stage liquid—liquid extraction by subjecting a flow of aqueous and organic phases in each extraction stage successively to pumping and mixing and settling, the apparatus for each extraction stage comprising: an overflow pump having a turbine encased by shell structures, conduits for the aqueous and organic phases connected to an overflow pump immediately beneath the turbine, a conduit for conducting dispersion from the bottom part of the overflow pump to the top part of a first mixer, the first mixer and other mixers being interconnected by a connecting channel located near the bottom of each mixer, said other mixers being provided with horizontal plates serving as lids, and an uptake shaft placed tangentially with respect to the rotational direction of a rotating agitator of a last mixer of said other mixers rising upwards from the bottom part of said last mixer for conducting a flow of mixed dispersion to a settler at a height between the bottom of the settler and the surface level of liquid in the settler.

2. The apparatus of claim 1 wherein the overflow pump turbine, near the surface of liquid in the pump, is encased by a conical side shell rising upwardly around the turbine and an air-stop plate directed outwardly from an axis of the turbine.

3. The apparatus of claim 1 wherein the turbine of the overflow pump is installed at height from the liquid surface that is 0.5–1.0 times the turbine diameter.

4. The apparatus of claim 1 wherein an air-stop plate provided externally above the turbine has angle-flow baffles conforming to the form of the air-stop plate and with interval flow baffles underneath the air-stop plate.

5. The apparatus according to claim 1 wherein an overflow threshold is formed by a side shell of the overflow pump turbine, said threshold being located higher up than an overflow edge of an organic phase collecting trough of the settler.

6. The apparatus of claim 1 wherein the mixer horizontal plates are located lower down than an overflow edge of an organic phase collecting trough of the settler.

7. The apparatus of claim 1 wherein top parts of the mixers are connected to the uptake shaft via start pipes having valves for controlling the phases of the dispersion.

* * * * *